(12) United States Patent
Ko

(10) Patent No.: US 12,167,166 B2
(45) Date of Patent: Dec. 10, 2024

(54) MULTI-CHANNEL IMAGE RECEIVING DEVICE AND METHOD

(71) Applicant: HANWHA TECHWIN CO., LTD., Seongnam-si (KR)

(72) Inventor: Jong Pil Ko, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 17/981,052

(22) Filed: Nov. 4, 2022

(65) Prior Publication Data
US 2023/0144726 A1     May 11, 2023

(30) Foreign Application Priority Data
Nov. 5, 2021    (KR) ........................ 10-2021-0151450

(51) Int. Cl.
| | |
|---|---|
| H04N 7/12 | (2006.01) |
| H04N 7/08 | (2006.01) |
| H04N 7/18 | (2006.01) |
| H04N 5/77 | (2006.01) |

(52) U.S. Cl.
CPC ............. *H04N 7/12* (2013.01); *H04N 7/0806* (2013.01); *H04N 7/181* (2013.01); *H04N 5/77* (2013.01)

(58) Field of Classification Search
CPC ...................................................... H04N 7/12
See application file for complete search history.

(56) References Cited

U.S. PATENT DOCUMENTS

| | | | | |
|---|---|---|---|---|
| 8,630,526 B1* | 1/2014 | O'Neil | ................. | H04N 23/684 |
| | | | | 701/413 |
| 2008/0049116 A1* | 2/2008 | Tojima | ................. | H04N 23/698 |
| | | | | 348/222.1 |
| 2009/0016622 A1* | 1/2009 | Itakura | ................. | H04N 21/845 |
| | | | | 375/E7.199 |
| 2012/0262576 A1* | 10/2012 | Sechrist | ........... | H04N 21/21805 |
| | | | | 348/E5.031 |
| 2015/0125124 A1* | 5/2015 | Dozier | ................... | H04N 5/772 |
| | | | | 386/223 |

(Continued)

FOREIGN PATENT DOCUMENTS

| | | | | |
|---|---|---|---|---|
| CN | 106453370 A | * | 2/2017 | ......... H04L 61/6022 |
| EP | 2 819 407 A1 | | 12/2014 | |

(Continued)

OTHER PUBLICATIONS

Extended European Search Report issued Mar. 27, 2023 from the European Patent Office to EP Application No. 22204997.5.

*Primary Examiner* — Daniel T Tekle
(74) *Attorney, Agent, or Firm* — Sughrue Mion, PLLC

(57) ABSTRACT

A multi-channel image receiving method includes receiving, from a network camera supporting a plurality of channels, access information for registering a first channel among the plurality of channels and profile information on a second channel other than the first channel, registering the first channel as a regular channel by using the access information, registering the second channel as a virtual channel by using the profile information, requesting the network camera to transmit an image through the second channel by using the profile information, and receiving and storing the image transmitted from the network camera through the second channel.

13 Claims, 6 Drawing Sheets

(56) References Cited

U.S. PATENT DOCUMENTS

| | | | |
|---|---|---|---|
| 2017/0289214 A1* | 10/2017 | Cho | H04L 65/4015 |
| 2017/0339392 A1* | 11/2017 | Forutanpour | H04N 19/46 |
| 2018/0176449 A1* | 6/2018 | Yoon | H04N 23/661 |
| 2023/0144726 A1* | 5/2023 | Ko | H04N 23/90 |
| | | | 348/143 |

FOREIGN PATENT DOCUMENTS

| | | |
|---|---|---|
| KR | 10-0783713 B1 | 12/2007 |
| KR | 10-2013-0119248 A | 10/2013 |
| KR | 10-2015-0141095 A | 12/2015 |
| KR | 10-1904050 B1 | 10/2018 |

* cited by examiner

MULTI-CHANNEL IMAGE RECEIVING DEVICE AND METHOD

CROSS-REFERENCE TO RELATED APPLICATION

This application claims priority from Korean Patent Application No. 10-2021-0151450 filed on Nov. 5, 2021, in the Korean Intellectual Property Office, and all the benefits accruing therefrom under 35 U.S.C. 119, the contents of which in its entirety are herein incorporated by reference.

BACKGROUND

1. Technical Field

The present disclosure relates to an image receiving device for receiving a channel image from a network camera supporting multiple channels, and more particularly, to an image receiving device and method capable of receiving an image through other channels without registering a separate channel after registering one channel.

2. Description of the Related Art

In order to set a network for the network video recorder (NVR) and the Internet protocol (IP) camera, professional knowledge related to IP network settings is required, and therefore, it is not easy for a user without professional knowledge related to the IP network settings to manually perform network settings for the NVR and the IP camera.

In order to solve such a problem, Korean Patent Laid-Publication No. 2013-0119248 (Patent Document 1) suggests a technology that may solve an inconvenience of having to manually set the network settings for an NVR and an IP camera one by one for a user without professional knowledge related to IP network settings by implementing an automatic establishment of a connection between the NVR device and the IP camera with minimal user intervention.

However, Patent Document 1 has a limit to the use of an automatic registration function of a wireless camera because it is not a fully automated method when connecting between a wireless NVR device and the wireless camera in a connection process before establishing the connection between the wireless NVR device and the wireless camera.

In addition, in consideration of such a problem, Korean Patent Laid-Open Publication No. 2015-0141095 (Patent Document 2) discloses a function of automatically registering wireless cameras in an NVR. According to Patent Document 2, user convenience is improved by automating the connection between the wireless NVR device and the wireless camera in a plug-and-play manner in the connection process before establishing the connection between the wireless NVR device and the wireless camera. Specifically, Patent Document 2 proposes a two-step connection structure in which a virtual connection is sequentially attempted to each wireless NVR device by using an initial connection password for each channel of the NVR, and an actual connection is made when authentication is confirmed.

However, the conventional technologies including the above-described technologies suggest a more automated method for registering each channel from the network camera supporting multiple channels, but in order to receive an image from a necessary channel, because the image needs to be received after registering the corresponding channel each time, a procedure is cumbersome and it is difficult to avoid an occurrence of time delays.

SUMMARY

Aspects of the present disclosure receive, display, or retransmit an image by setting a virtual channel for channels other than a registered channel when one channel is registered in a multi-channel image receiving device such as a network video recorder in multi-channel termination equipment such as a multi-channel monitoring camera and a multi-channel encoder.

Aspects of the present disclosure also improve asymmetric performance by enabling more channels to be used quickly when performing display or retransmission without storage in a multi-channel image receiving device that has superior display performance or network performance compared to storage performance.

However, aspects of the present invention are not restricted to those set forth herein. The above and other aspects will become more apparent to one of ordinary skill in the art to which the disclosure pertains by referencing the detailed description of the present invention given below.

According to an aspect of an exemplary embodiment, in a device including a processor and a memory for storing instructions executable by the processor, a multi-channel image receiving method performed by the instructions under the control of the processor, the multi-channel image receiving method includes: receiving, from a network camera supporting a plurality of channels, access information for registering a first channel among the plurality of channels and profile information on a second channel other than the first channel; registering the first channel as a regular channel by using the access information; registering the second channel as a virtual channel by using the profile information; requesting the network camera to transmit an image through the second channel by using the profile information; and receiving and storing the image transmitted from the network camera through the second channel.

The access information includes an Internet protocol address of the network camera, an access ID, an access password, and the profile information.

The profile information includes streaming capability and streaming uniform resource identifier (URI).

An image transmitted through the first channel is an original fisheye image, and the image transmitted through the second channel is a dewarp image of a partial region of the original fisheye image.

An image transmitted through the first channel is a live image and/or an image for storage, and the image transmitted through the second channel is a live image.

The streaming capability includes at least one of a communication protocol, a support resolution, a support frame rate, and a support bit rate supported by the second channel.

When the second channel is registered as the virtual channel, the second channel is displayed to a user as a hierarchical sub-connection to the first channel.

When a third channel is registered as the regular channel, the third channel is displayed to the user in parallel with the first channel.

The multi-channel image receiving method further includes deleting the second channel registered as the virtual channel by deleting the profile information on the second channel stored in the memory.

According to another aspect of an exemplary embodiment, in a device including a processor and a memory for storing instructions executable by the processor, a multi-channel image receiving method performed by the instructions under the control of the processor, the multi-channel image receiving method includes: receiving access information on a first channel from a network camera supporting the first channel and a second channel; registering the first channel as a registration channel by using the access information of the first channel; requesting an image of the second channel from the network camera by using the access information of the first channel; and receiving the image of the second channel through the registration channel.

The multi-channel receiving method further includes retransmitting the image of the second channel to a display and/or another device.

The access information includes an Internet protocol address of the network camera, an access ID, an access password, and profile information.

The requesting of the image of the second channel includes requesting the network camera to transmit an image through the second channel by using the access information of the first channel and profile information of the second channel.

The profile information includes streaming capability and streaming uniform resource identifier (URI).

The streaming capability includes at least one of a communication protocol, a support resolution, a support frame rate, and a support bit rate supported by the second channel.

The multi-channel image receiving method further includes receiving an image of the first channel through the registration channel, wherein the image of the first channel is an original fisheye image, and the image of the second channel is a dewarp image of a partial region of the original fisheye image.

The multi-channel image receiving method further includes receiving an image of the first channel through the registration channel, wherein the image of the first channel is a live image and/or an image for storage, and the image of the second channel is a live image.

According to the present disclosure, since it is not necessary to individually register each channel in the multi-channel image receiving device such as the network video recorder to receive and display or retransmit all channels of the multi-channel termination equipment, it is possible to quickly receive or stream the image when it is necessary to receive a specific channel depending on the situation.

Therefore, the same effect as when a plurality of channels supported by the multi-channel termination equipment are registered at once is provided by only one channel registration among the plurality of channels supported by the multi-channel termination equipment.

According to the present disclosure, in order to monitor all channels of the multi-channel termination equipment, it is not necessary to consume resources for registration of all channels of the multi-channel image receiving device, and it is sufficient to store a resource for registration of one channel in a memory.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
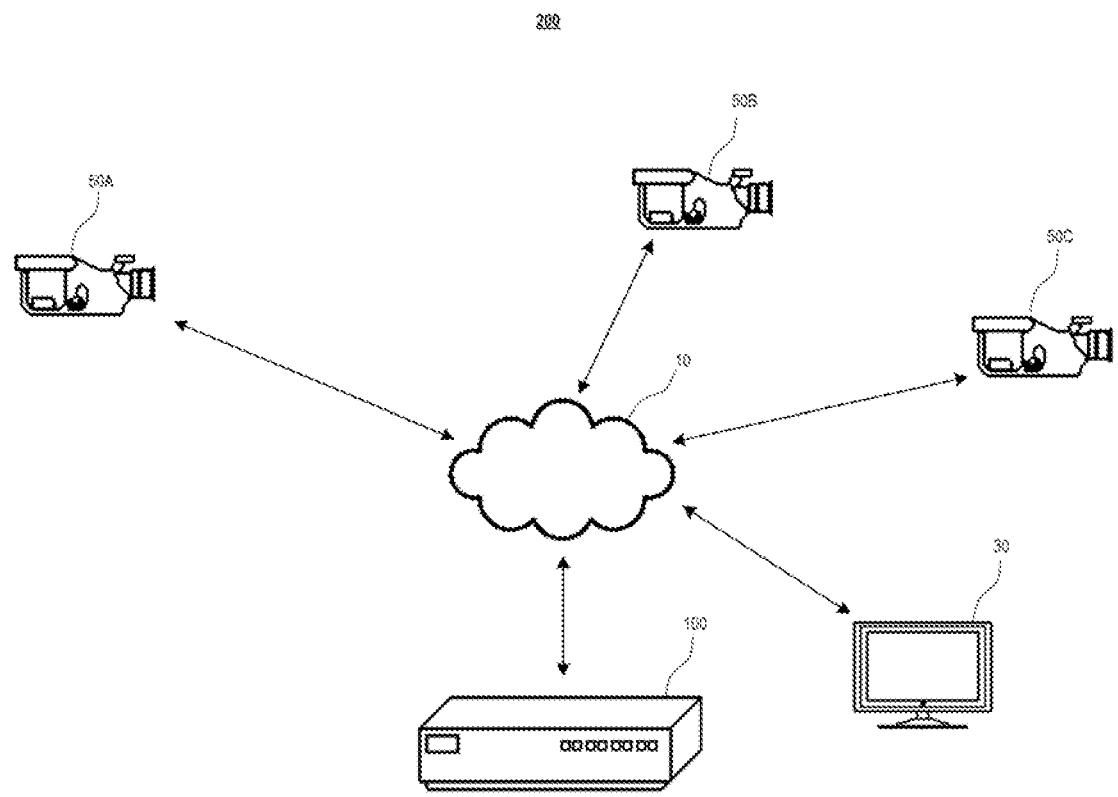
FIG. 1 is a diagram illustrating a configuration of a monitoring system according to an exemplary embodiment of the present disclosure.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

FIG. 1 is a diagram illustrating a configuration of a monitoring system 200 according to an exemplary embodiment of the present disclosure. Referring to FIG. 1, a monitoring system 200 includes a plurality of network cameras 50 (50A, 50B, and 50C), a multi-channel image receiving device 100, and a user terminal device 30, and the plurality of network cameras 50A, 50B, and 50C, the multi-channel image receiving device 100, and the user terminal device 30 are connected to each other through a network 10 such as the Internet or an intranet. A representative example of the multi-channel image receiving device may include a network video recorder 100. In addition, although only three network cameras are illustrated in FIG. 1, the present disclosure is not limited thereto.

The network camera 50 captures an image (monitoring image) of a monitoring area, processes the captured image according to the Internet protocol, and transmits the processed image. In particular, the network camera 50 may broadcast a LAN ID tag matching a corresponding channel number connected according to a request of the multi-channel image receiving device 200 and receive the Internet protocol address allocated accordingly.

The multi-channel image receiving device 100 has a built-in network interface connected to the plurality of network cameras 50, and receives access information such as a channel number of a specific network camera 50. The multi-channel image receiving device 100 may broadcast by allocating an Internet protocol address by using the received channel number.

The user terminal device 30 may be implemented as a personal computer, a mobile terminal, and the like, and may be connected to the multi-channel image receiving device 200 through the network 10 and receives the monitoring area stored in the multi-channel image receiving device 200 to provide an Internet protocol-based monitoring service.

Figure 2:
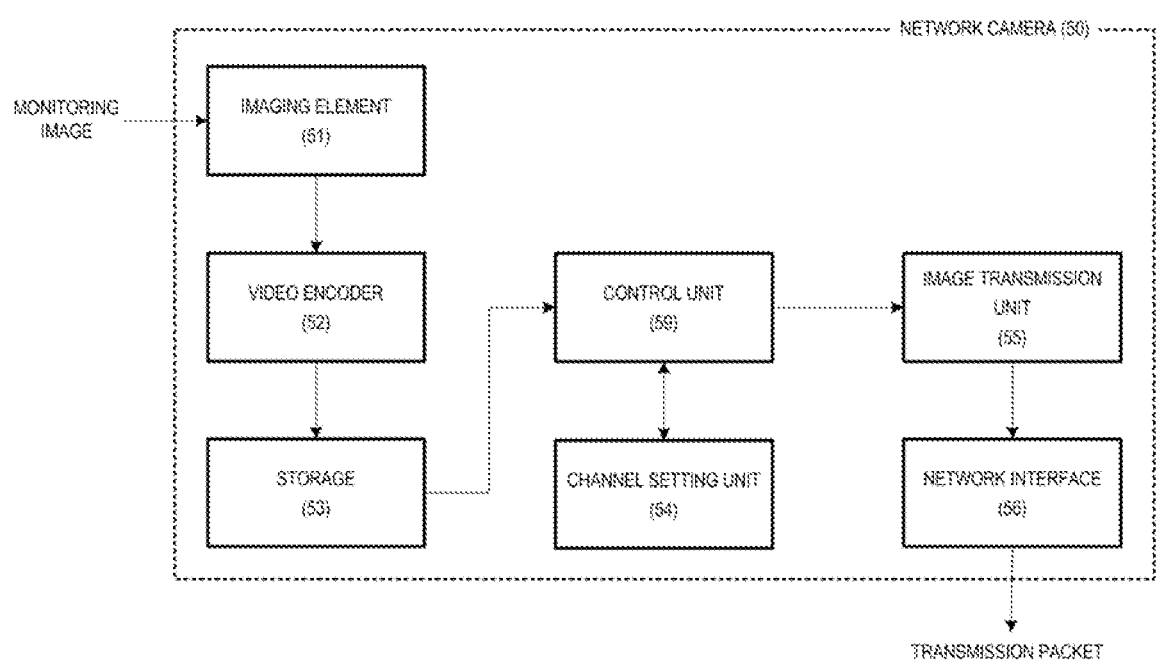
FIG. 2 is a block diagram illustrating a configuration of a network camera according to an exemplary embodiment of the present disclosure.

FIG. 2 is a block diagram illustrating a configuration of a network camera 50 according to an exemplary embodiment of the present disclosure. In terms of hardware, the network camera 50 may include a processor and a memory for storing instructions executable by the processor, and may include, as functional blocks thereof, an imaging element 51, a video encoder 52, a storage 53, a channel setting unit 54, an image transmission unit 55, a network interface 56, and a control unit 59 that generally controls the functional blocks.

The imaging element 51 may be implemented by a charge coupled device (CCD) or a complementary metal-oxide semiconductor (CMOS), and captures an external monitoring image and stores the captured image in the storage 52. In addition, event information obtained through video analytics (VA) together with the monitoring image may be additionally stored in the storage 52. The event information is metadata capable of expressing contents of an image obtained from the captured image, and includes a type of object, a situation of an event, and the like.

In general, the captured monitoring image is first encoded by the video encoder 52 for storage efficiency and then stored in the storage 53. The video encoder 52 may embed an image codec such as H.264/AVC, HEVC, or Mpeg-4 for image compression.

The channel setting unit 54 sets channel information included in the plurality of channels supported by the network camera 50 by using a communication port and a LAN ID.

The image transmission unit 55 generates a transmission packet from the monitoring image stored in the storage 53. The transmission packet is generated according to a protocol for transmission, and the transmission packet may be generated based on, for example, Transmission Control Protocol/Internet Protocol (TCP/IP) or Real-Time Streaming Protocol (RTSP).

The network interface 56 includes a physical layer for network communication, transmits access information for channel registration to the multi-channel image receiving device 200, and transmits a monitoring image to a specific channel according to an image transmission request when receiving the image transmission request through the specific channel from the multi-channel image receiving device 200.

Figure 3:
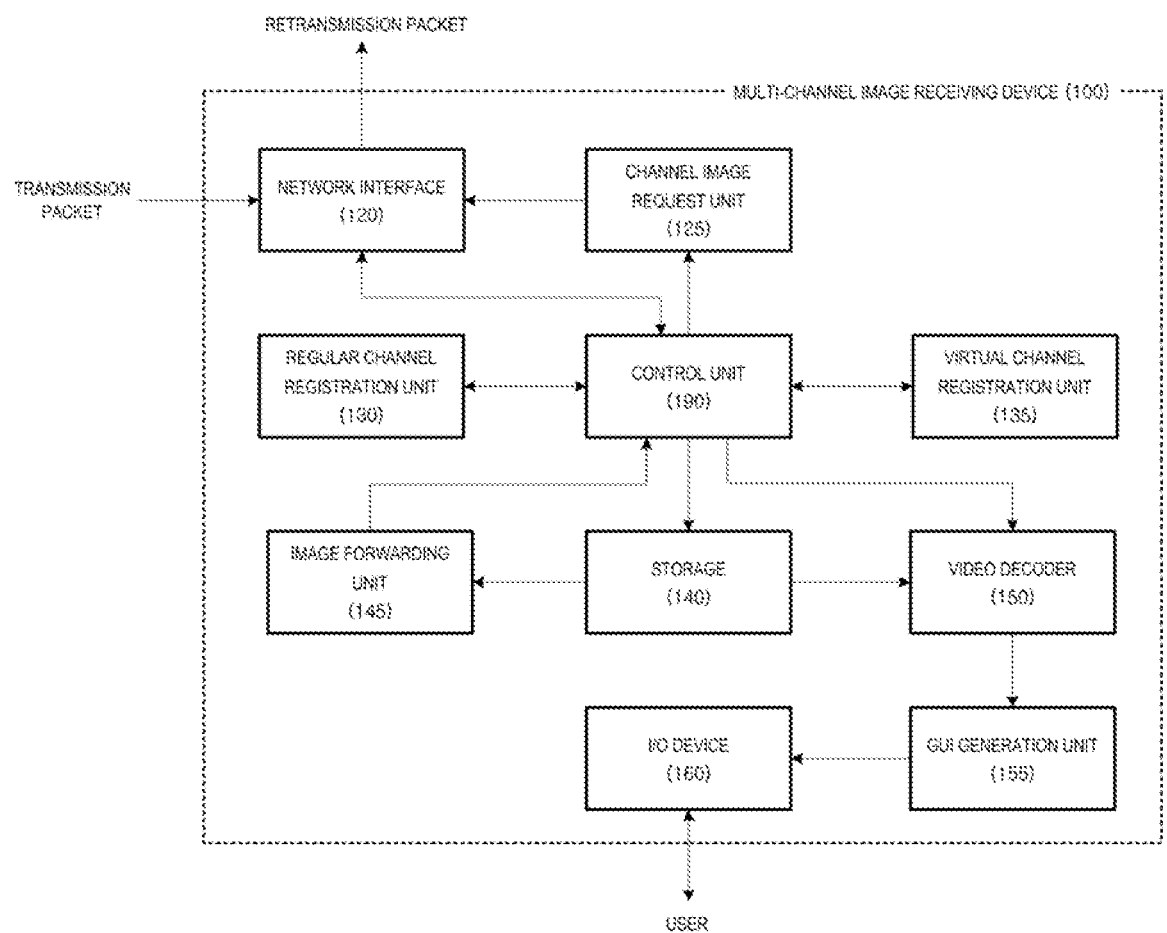
FIG. 3 is a block diagram illustrating a configuration of a multi-channel image receiving device according to an exemplary embodiment of the present disclosure.

FIG. 3 is a block diagram illustrating a configuration of a multi-channel image receiving device 100 according to an exemplary embodiment of the present disclosure. In terms of hardware, the multi-channel image receiving device 100 may include a processor and a memory for storing instructions executable by the processor, and may include, as functional blocks thereof, a network interface 120, a channel image request unit 125, a regular channel registration unit 130, a virtual channel registration unit 135, a storage 140, an image forwarding unit 145, a video decoder 150, a graphic user interface (GUI) generation unit 155, an I/O device 160, and a control unit 59 that generally controls the functional blocks.

The network interface 120 includes a physical layer for network communication, receives access information for channel registration from the multi-channel image receiving device 200, transmits an image transmission request through a specific channel to the multi-channel image receiving device 200, and receives a monitoring image through the specific channel according to the image transmission request.

The channel image request unit 125 transmits a message requesting image transmission for a specific channel to the network camera 50 through the network interface 120. In addition, the channel image request unit 125 requests access information for a corresponding channel from the network camera 50 prior to the image transmission. Such access information includes an Internet protocol address of the network camera 50, channel information, access ID, access password, and profile information. A user of the multi-channel image receiving device 100 uses the Internet protocol address for connection to the network camera 50, and uses a pair of the access ID and the access password to authenticate the access to the network camera 50. The channel information means channel information (channel information, number of channels, and the like) set in the network camera 50 by using the communication port and the LAN ID. In addition, the profile information means transmission information for actually receiving the transmission packet, such as streaming capability and streaming uniform resource identifier (URI). The streaming capability includes options supported by the network camera 50 for image transmission, such as a communication protocol, a support resolution, a support frame rate, and a support bit rate supported by the channel.

In response to such a request, the network interface 120 receives additional information on channels other than the channel supported by the network camera 50, for example, profile information, together with the access information for registering the channel from the network camera 50.

Conventionally, when it is necessary to transmit an image for a certain channel, the image receiving device has to register the corresponding channel one by one. This causes various problems such as not only consuming resources, but also delaying time when an image is requested while changing a channel. Therefore, according to the present disclosure, when access information of a certain channel (first channel) is received for the first time, additional information on other channels that may be supported by network camera 50 than the certain channel in addition to the access information of the first channel is also received. Since unique information on the network camera 50 has already been received when the access information of the first channel is received, such additional information may minimally include only information necessary for image transmission of another channel (second channel), for example, profile information.

Accordingly, the regular channel registration unit 130 registers the first channel as a normal physical channel by using the access information on the first channel and stores related information in the storage 140, and the virtual channel registration unit 135 registers the second channel as a virtual channel by using additional information on the second channel other than another channel, that is, profile information.

The profile information means transmission information for actually receiving the transmission packet, such as streaming capability and streaming uniform resource identifier (URI) as described above, and the streaming capability includes options supported by the network camera 50 for image transmission, such as a communication protocol, a support resolution, a support frame rate, and a support bit rate supported by the channel. In addition, the virtual channel means a "virtual" channel that exists only as a data set in the memory without performing a general registration procedure unlike an actually registered regular channel and is used to equally process the registration of the actual regular channel.

As a specific application example, an original fisheye image may be received through the first channel that is the regular channel, and a dewarp image of a partial region of the original fisheye image may be received through another channel that is the virtual channel. Therefore, the user of the multi-channel image receiving device 100 may receive a distorted original fisheye image through the physical first channel and quickly receive the dewarp image at a specific location through other channels whenever necessary. If the image transmission is frequently requested while changing to any one of the first channel and other channels, it is possible to quickly request and receive the corresponding dewarp image from the network camera 50 only with the profile information stored in the memory as the virtual channel without performing a separate registration procedure, according to the present disclosure.

As another application example, an image for storage that is received and stored in the storage 140 may be received through the first channel that is the regular channel, and a live image to be played directly through a display or to be retransmitted to the user terminal device 30 without needing to be permanently/semi-permanently stored may be received through another channel, that is the virtual channel. Through this, an image that is important enough to need to be stored may be received through the regularly registered first channel, but an image that does not need to be stored may be quickly received through the virtual channel.

Actually, when the image reception through the virtual channel is required, the channel image request unit 125 requests the network camera 50 to transmit the image through the second channel by using the profile information stored in the memory. Thereafter, the network interface 120 receives the image transmitted from the network camera through the second channel, and the storage 140 stores the received image.

Meanwhile, the image forwarding unit 145 may regenerate the monitoring image stored in the storage 140 as a retransmission packet and forward the retransmission packet to the user terminal device 30 through the network interface 120.

The video decoder 150 generates a restored image by decoding the transmission packet of the monitoring image received from the network camera 50 through the network interface 120. To this end, the video decoder 150 may embed an image codec such as H.264/AVC, HEVC, or Mpeg-4 for image restoration.

The GUI generation unit 155 may display the monitoring image decoded by the video decoder 150 to the user through the I/O device 160 together with a graphic user interface (GUI) through which the user may visually confirm. In this case, the GUI may include access information of a plurality of channels of a specific network camera 50. For example, when the second channel is registered as the virtual channel, the second channel may be displayed to the user as a hierarchical sub-connection to the first channel.

Finally, the I/O device 160 includes an input/output means capable of interacting with the user, such as a display device such as an LCD and an LED, a touch panel, and a mouse.

Figure 4:
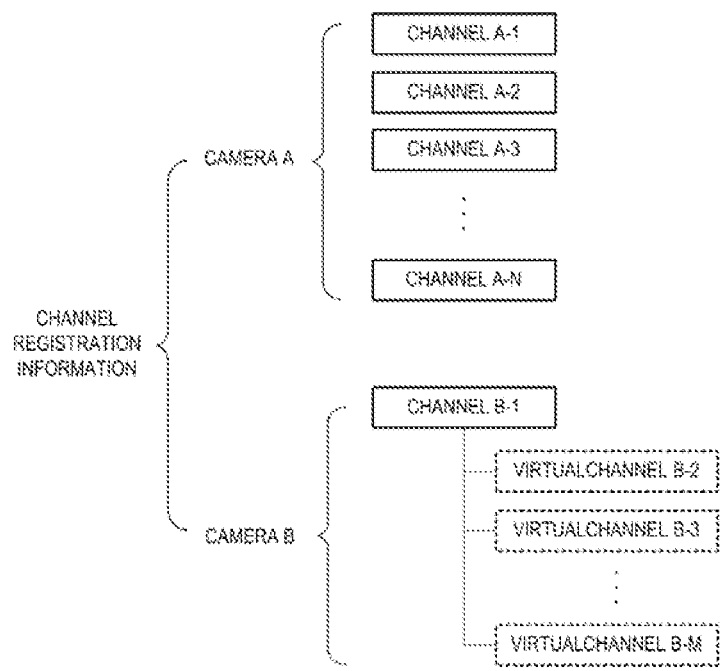
FIG. 4 is a diagram in which channel access information is displayed in a GUI according to an exemplary embodiment of the present disclosure.

FIG. 4 is a diagram in which channel access information is displayed in a GUI according to an exemplary embodiment of the present disclosure. In FIG. 4, the multi-channel image receiving device 100 registers channel information on a camera A and a camera B and displays the channel information in a GUI. The camera A has N channels of channels A-1 to A-N, and the camera B has M channels of channels B-1 to B-M. Here, it may be seen that all channels of camera A are registered through a regular channel registration process and are thus displayed in parallel, while only the channel B-1 among the channels of the camera B is registered through the regular channel registration process and the remaining channels are registered as the virtual channels.

In addition, it may be seen that all virtual channels B-2 to B-M of the camera B are registered as the virtual channels together in the registration process of the channel B-1. That is, the multi-channel image receiving device 100 receives additional information on the remaining channels when channel B-1 is registered, and stores the received additional information as a data set in the memory. Thereafter, when it is necessary to receive a monitoring image through the channels other than the channel B-1, it is possible to request the monitoring image from the camera B without a separate registration process and to quickly receive the monitoring image.

According to the present disclosure, a virtual channel generation process ("makeNewNetCam4VC") may be created, for example, in pseudo code as illustrated in Table 1 below. In particular, virtual channel information through the registered channel is performed by a "MAKE_VC_CHANNEL(1Ch, subCh)" function. In this case, "1Ch" means a channel that is regularly registered, and "subCh" means a channel that is registered as a virtual channel as a lower hierarchical structure of the channel.

TABLE 1

NetCamera* NetCameraManager::makeNewNetCam4VC(unsigned int1Ch, int subCh, EncUsage_t usage )
{
  NetCamera* pNetCam = getNetCamera( lCh );
  if( NULL == pNetCam )
  {
    LOG_WARN( "Invalid NVR Channel : %u\n", lCh );
    return NULL;
  }
  DeviceConnInfo conInfo = pNetCam->getConnInfo( );
  if( VIDEO_ENCODER_TYPE::VIDEO_ENCODER_VNP2 != conInfo.getProtocolType( ) )
  {
    LOG_WARN( "Invalid protocol type : %d\n", conInfo.getProtocolType( ) );
    return NULL;
  }
  if( CAM_PROTOCOL::CAM_SAMSUNG != conInfo.GetProtocol( ) )
  {
    LOG_WARN( "Invalid protocol : %u\n", conInfo.GetProtocol( ) );
    return NULL;
  }
  if( pNetCam->isMultiChannelSupported( ) == false )
  {
    LOG_WARN( "not support multi channel device( %s ).\n", TABLE 1-continued

```
conInfo.getIP( ).c_str( ) );
    return NULL;
}
if( subCh == conInfo.getMultiChIndex( ) )
{
    LOG_WARN( "subchannel(%d) of MDC is already registerd.\n",
conInfo.getMultiChIndex( ) );
    return NULL;
}
conInfo.setMultiChIndex( subCh );
conInfo.SetVirtualCam( true );
pNetCam = makeNewNetCamera( conInfo );
pNetCam->SetOwnerUsage( usage );
std::list<int> chs;
int vch = MAKE_VC_CHANNEL( lCh, subCh );
chs.push_back( vch );
pNetCam->setChannels( chs, true );
pNetCam->connect( );
cam_conn_info_list camConnInfo;
camConnInfo.cam_conn_info = conInfo;
camConnInfo.pNetCam = pNetCam;
camConnInfo.chs = chs;
pthread_mutex_lock( &m_mutex_curCamlists );
m_curCamlists.push_back( camConnInfo );
pthread_mutex_unlock( &m_mutex_curCamlists );
return pNetCam;
}
```

Meanwhile, according to the present disclosure, a virtual channel deletion process ("deleteNetCam4VC") may be created, for example, in pseudo code as illustrated in Table 2 below. When the virtual channel is deleted, profile information related to the deleted virtual channel is also deleted from the memory. The deletion of the virtual channel may be performed through the virtual channel registration unit 135 when the memory is saturated or there is no need to receive the monitoring image through the corresponding virtual channel.

TABLE 2

```
int NetCameraManager::deleteNetCam4VC( unsigned int lCh, int
subCh, bool bForceDelete /*= false*/ )
{
    int nRet = -1;
    int nVC = MAKE_VC_CHANNEL( lCh, subCh );
    pthread_mutex_lock( &m_mutex_curCamlists );
    for( auto it = m_curCamlists.begin( ); it != m_curCamlists.end( ); )
    {
        std::list<int> chs = it->chs;
        auto find_it = std::find( chs.begin( ), chs.end( ), nVC );
        if( find_it == chs.end( ) )
        {
            ++it;
            continue;
        }
        SUNAPINetCamera* pSunapiNetCamera = dynamic_cast<
SUNAPINetCamera* >( it->pNetCam );
        if( pSunapiNetCamera == NULL )
        {
            ++it;
            continue;
        }
        if( it->pNetCam->getmProfilesCount( ) == 0 || bForceDelete ==
true )
        {
            int nTotalUsageCount = 0;
net::netCamera::NetVirtualCameraLimiter::getInstance( )->DeleteUsage
( nVC, nTotalUsageCount );
            deleteNetCamera( it->pNetCam );
            it = m_curCamlists.erase( it );
            nRet = 0;
        }
        else
        {
            ++it;
```

TABLE 2-continued

```
            nRet = 1;
        }
    }
    pthread_mutex_unlock( &m_mutex_curCamlists );
    return nRet;
}
```

In the exemplary embodiment, the process of registering one channel (the first channel) as the regular channel from the network camera supporting a plurality of channels and registering the remaining channels (the second channel) as the virtual channel by using the access information of the regular channel without the registration process as described above has been described. As described above, the multi-channel image receiving device 100 may receive an image of each channel by regularly registering only one channel (the first channel) and registering the remaining channels (the second channel) as the virtual channels without registration, instead of registering all of the plurality of channels of the network camera 50.

However, the present disclosure is not limited thereto, and another exemplary embodiment is also possible in which the multi-channel image receiving device 100 receives the image through the plurality of channels of the network camera 50 by using access information on the registered regular channel (registration channel) without registering the virtual channel as it is. In this case, the multi-channel image receiving device 100 may register only one channel among the plurality of channels supported by the network camera 50 and then may request and receive the images of the remaining channels through the registered channel by using the access information of the registered channel.

According to the exemplary embodiment, the multi-channel image receiving device 100 may perform the following process.

First, the network interface 120 receives, from a network camera supporting a plurality of channels, access information on a first channel among the plurality of channels. The access information may include an Internet protocol address of the network camera, an access ID, an access password, and the profile information.

In addition, the regular channel registration unit 130 registers the first channel as a registration channel by using the access information of the first channel.

Thereafter, the channel image request unit 125 requests images of the remaining channels (second channel) among the plurality of channels from the network camera 50 by using the access information of the first channel as it is.

In this case, the channel image request unit 125 may request the network camera 50 to transmit an image through the second channel by using the access information of the first channel and the profile information of the remaining channels. The profile information may include streaming capability and streaming uniform resource identifier (URI). Here, the streaming capability may include at least one of a communication protocol, a support resolution, a support frame rate, and a support bit rate supported by the second channel.

As a result of the request, the network interface 120 may receive the image of the second channel through the registration channel (the channel regularly registered with respect to the first channel).

The received image of the second channel may be displayed on a screen by the GUI generation unit 155 or may be retransmitted to another device by the image forwarding unit 145.

Not only the image of the second channel but also an original image of the first channel may also be received through the registration channel.

In this case, the image of the first channel may be an original fisheye image, and the image of the second channel may be a dewarp image of a partial region of the original fisheye image. In this case, one original fisheye image and a plurality of dewarp images processed therefrom may be received through the one registration channel. In this case, the network camera 50 may be a fisheye camera.

Alternatively, the image of the first channel may be a live image and/or an image for storage, and the image of the second channel may be a live image. For example, the image of the first channel may be an image (e.g., a front image) obtained by imaging an object in a main direction, and the image of the second channel may be an image obtained by imaging an object in a plurality of different directions (e.g., a plurality of images obtained by imaging the object at different angles). In this case, the network camera 50 may be a multi-sensor camera.

As described above, according to the present disclosure, the multi-channel image receiving device 100 may receive the plurality of images through one channel registered in the multi-channel image receiving device 100 from the network camera 50 that images/generates one image and derivative images related to the image.

Figure 5:
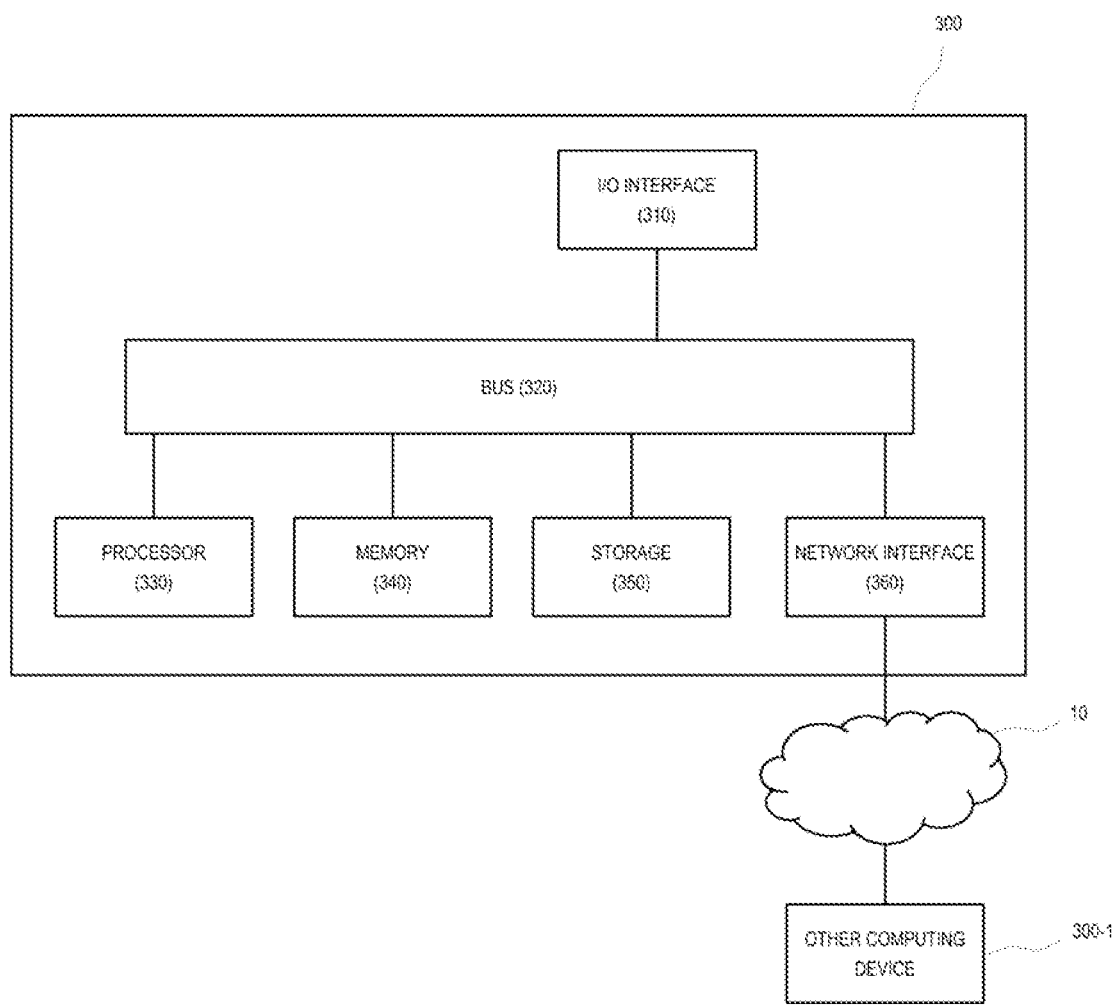
FIG. 5 is a block diagram illustrating the hardware configuration of a computing device that implements a multi-channel image receiving device.

FIG. 5 is a block diagram illustrating the hardware configuration of a computing device 300 that implements a multi-channel image receiving device 100.

Referring to FIG. 5, a computing device 300 includes a bus 320, a processor 330, a memory 340, a storage 350, an input/output interface 310, and a network interface 360. The bus 320 is a path for the transmission of data between the processor 330, the memory 340, the storage 350, the input/output interface 310, and the network interface 360. However, it is not particularly limited how the processor 330, the memory 340, the storage 350, the input/output interface 310, and the network interface 360 are connected. The processor 330 is an arithmetic processing unit such as a central processing unit (CPU) or a graphics processing unit (GPU). The memory 340 is a memory such as a random-access memory (RAM) or a read-only memory (ROM). The storage 350 is a storage device such as a hard disk, a solid state drive (SSD), or a memory card. The storage 350 may also be a memory such as a RAM or a ROM.

The input/output interface 310 is an interface for connecting the computing device 300 and an input/output device. For example, a keyboard or a mouse is connected to the input/output interface 310.

The network interface 360 is an interface for communicatively connecting the computing device 300 and an external device to exchange transport packets with each other. The network interface 360 may be a network interface for connection to a wired line or for connection to a wireless line. For example, the computing device 300 may be connected to another computing device 300-1 via a network 10.

The storage 350 stores program modules that implement the functions of the computing device 300. The processor 330 implements the functions of the computing device 300 by executing the program modules. Here, the processor 330 may read the program modules into the memory 340 and may then execute the program modules.

The hardware configuration of the computing device 300 is not particularly limited. For example, the program modules may be stored in the memory 340. In this example, the computing device 300 may not include the storage 350.

The multi-channel image receiving device 100 may at least include the processor 330 and the memory 340, which stores instructions that can be executed by the processor 330. The multi-channel image receiving device 100 of FIG. 3, in particular, can be driven by executing instructions including a variety of functional blocks or steps included in the multi-channel image receiving device 100, via the processor 330.

Figure 6:
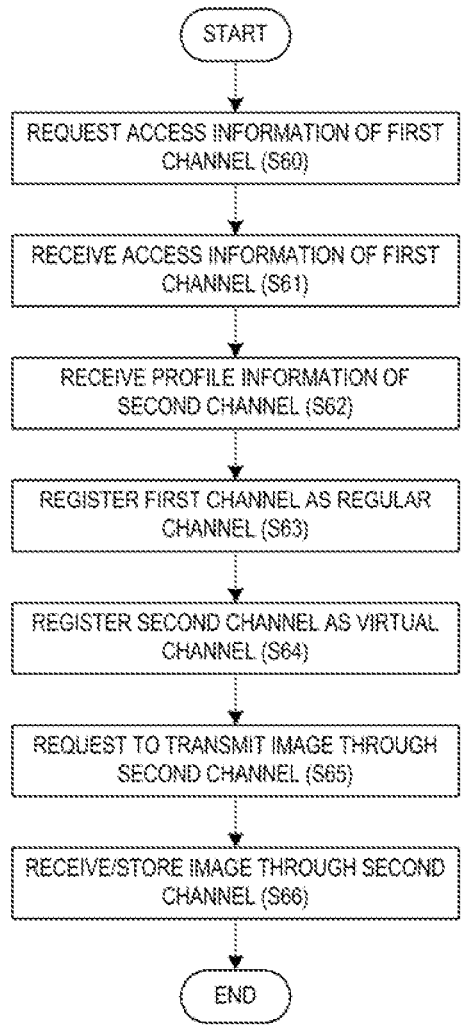
FIG. 6 is a flowchart illustrating a multi-channel image receiving method performed by the multi-channel image receiving device.

FIG. 6 is a flowchart illustrating a multi-channel image receiving method performed by the multi-channel image receiving device 100.

First, the channel image request unit 125 requests access information of a first channel among a plurality of channels from the network camera 50 supporting the plurality of channels (S60). Accordingly, the network interface 120 receives the access information for registering the first channel from the network camera 50 (S61), and at the same time, receives profile information on a second channel other than the first channel (S62).

The regular channel registration unit 130 registers the first channel as a regular channel by using the access information (S63), and the virtual channel registration unit 135 registers the second channel as a virtual channel by using the profile information on the second channel (S64).

Thereafter, the channel image request unit 125 requests the network camera 50 to transmit an image through the second channel by using the profile information on the second channel (S65). Then, the network interface 120 receives the image transmitted from the network camera through the second channel, and the storage 140 stores the received image (S66).

Thereafter, the virtual channel registration unit 135 may also delete the second channel registered as the virtual channel by deleting the profile information on the second channel stored in the memory.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. In a device including a processor and a memory for storing instructions executable by the processor, a multi-channel image receiving method performed by the instructions under a control of the processor, the multi-channel image receiving method comprising:

receiving, from a network camera supporting a plurality of channels, access information for registering a first channel among the plurality of channels and profile information on a second channel other than the first channel;

registering the first channel as a regular channel by using the access information;

registering the second channel as a virtual channel by using the profile information without the access information for the second channel;

requesting the network camera to transmit an image through the second channel by using the profile information; and receiving the image transmitted from the network camera through the second channel, wherein the access information comprises an Internet protocol address of the network camera, an access ID, an access password, and the profile information, and wherein the profile information comprises streaming capability and streaming uniform resource identifier (URI), other than the Internet protocol address of the network camera, the access ID, and the access password, and wherein the virtual channel exists as a data set in the memory without performing a general registration procedure applied to the regular channel, and the second channel registered as the virtual channel is configured to be deleted by simply deleting the profile information on the second channel stored in the memory, without performing an additional unregistration procedure for the second channel.

2. The multi-channel image receiving method of claim 1, wherein an image transmitted through the first channel is an original fisheye image, and the image transmitted through the second channel is a dewarp image of a partial region of the original fisheye image.

3. The multi-channel image receiving method of claim 1, wherein an image transmitted through the first channel is a live image, which is stored in a storage, and the image transmitted through the second channel is a live image, which is not stored in the storage.

4. The multi-channel image receiving method of claim 1, wherein the streaming capability includes at least one of a communication protocol, a support resolution, a support frame rate, and a support bit rate supported by the second channel.

5. In a device including a processor and a memory for storing instructions executable by the processor, a multi-channel image receiving method performed by the instructions under a control of the processor, the multi-channel image receiving method comprising:

receiving, from a network camera supporting a plurality of channels, access information for registering a first channel among the plurality of channels and profile information on a second channel other than the first channel;

registering the first channel as a regular channel by using the access information;

registering the second channel as a virtual channel by using the profile information without the access information for the second channel;

requesting the network camera to transmit an image through the second channel by using the profile information; and receiving the image transmitted from the network camera through the second channel, wherein when the second channel is registered as the virtual channel, the second channel is displayed to a user as a hierarchical sub-connection to the first channel, and wherein the virtual channel exists as a data set in the memory without performing a general registration procedure applied to the regular channel, and the second channel registered as the virtual channel is configured to be deleted by simply deleting the profile information on the second channel stored in the memory, without performing an additional unregistration procedure for the second channel.

6. The multi-channel image receiving method of claim 5, wherein when a third channel is registered as the regular channel, the third channel is displayed to the user in parallel with the first channel.

7. In a device including a processor and a memory for storing instructions executable by the processor, a multi-channel image receiving method performed by the instructions under a control of the processor, the multi-channel image receiving method comprising:

receiving access information on a first channel from a network camera supporting the first channel and a second channel;

registering the first channel as a registration channel by using the access information of the first channel;

requesting an image of the second channel from the network camera by using the access information of the first channel; and receiving the image of the second channel through the registration channel, wherein the access information comprises an Internet protocol address of the network camera, an access ID, an access password, and profile information, and wherein a virtual channel exists as a data set in the memory without performing a general registration procedure applied to the registration channel, and the second channel registered as the virtual channel is configured to be deleted by simply deleting the profile information on the second channel stored in the memory, without performing an additional unregistration procedure for the second channel.

8. The multi-channel image receiving method of claim 7, further comprising retransmitting the image of the second channel to a display and/or another device.

9. The multi-channel image receiving method of claim 7, wherein the requesting of the image of the second channel includes requesting the network camera to transmit an image through the second channel by using the access information of the first channel and the profile information of the second channel.

10. The multi-channel image receiving method of claim 9, wherein the profile information comprises streaming capability and streaming uniform resource identifier (URI), other than the Internet protocol address of the network camera, the access ID, and the access password.

11. The multi-channel image receiving method of claim 10, wherein the streaming capability includes at least one of a communication protocol, a support resolution, a support frame rate, and a support bit rate supported by the second channel.

12. The multi-channel image receiving method of claim 7, further comprising receiving an image of the first channel through the registration channel, wherein the image of the first channel is an original fisheye image, and the image of the second channel is a dewarp image of a partial region of the original fisheye image.

13. The multi-channel image receiving method of claim 7, further comprising receiving an image of the first channel through the registration channel, wherein the image of the first channel is a live image and/or an image for storage, and the image of the second channel is a live image.

* * * * *